(12) United States Patent
Lei et al.

(10) Patent No.: US 6,779,992 B2
(45) Date of Patent: Aug. 24, 2004

(54) COMPOSITE HEAT-DISSIPATING DEVICE

(75) Inventors: Tsung-Yu Lei, Taipei (TW); Fu-Hau Tsai, Keelung (TW); Kuo-Cheng Lin, Taoyuan (TW); Wen-Shi Huang, Taoyuan (TW)

(73) Assignee: Delta Electronics Inc., Taoyuan Hsien (TW)

( * ) Notice: Subject to any disclaimer, the term of this patent is extended or adjusted under 35 U.S.C. 154(b) by 0 days.

(21) Appl. No.: 10/172,976

(22) Filed: Jun. 18, 2002

(65) Prior Publication Data

US 2003/0185682 A1 Oct. 2, 2003

(30) Foreign Application Priority Data

Mar. 28, 2002 (TW) ........................................ 91203882 U

(51) Int. Cl.$^7$ ............................................. F04D 29/34
(52) U.S. Cl. ............................. 418/198 R; 416/212 R; 416/228; 416/200 R
(58) Field of Search ........................ 416/198 R, 200 R, 416/212 R, 203, 228

(56) References Cited

U.S. PATENT DOCUMENTS

| 5,611,668 | A | * | 3/1997 | Yapp et al. | 416/189 |
| 6,318,964 | B1 | * | 11/2001 | Yang | 416/185 |
| 6,511,300 | B2 | * | 1/2003 | Otsuka | 417/354 |
| 6,572,336 | B2 | * | 6/2003 | Horng et al. | 416/183 |

* cited by examiner

Primary Examiner—Ninh H. Nguyen
(74) Attorney, Agent, or Firm—Birch, Stewart, Kolasch & Birch, LLP

(57) ABSTRACT

A composite heat-dissipating device is provided for significantly increasing the number and size of blades so as to enhance the heat-dissipating performance. The composite heat-dissipating device is constructed by a plurality of impellers, each of which includes a plurality of blades. When the plurality of impellers are assembled together, the plurality of blades are arranged around the hub of the composite heat-dissipating device and there is an overlapped region formed between every two adjacent blades.

26 Claims, 8 Drawing Sheets

COMPOSITE HEAT-DISSIPATING DEVICE

FIELD OF THE INVENTION

The present invention is related to a heat-dissipating device, and especially to a composite heat-dissipating device constructed by a plurality of impellers, each of which has a plurality of blades, for enhancing the heat-dissipating performance.

BACKGROUND OF THE INVENTION

Generally, in order to prevent the electronic device from being contaminated by particle or dust in the atmosphere, the electronic device is usually disposed in a closed housing. However, the electronic device will generate a lot of heat during the operating process. If the electronic device is continuously placed in a high-temperature state, it will easily cause a damage on the electronic device and shorten its useful life. Thus, in order to prevent the malfunction of the electronic device, a heat-dissipating fan is usually used to dissipate the heat generated by the electronic device from inside to external environment.

At the present time, a commonly used way for increasing the airflow discharged from the fan so as to enhance the heat-dissipating efficiency is to enlarge the size of blades of the fan or increase the number of blades. However, under the design limitation of mold used for manufacturing the fan, the size or number of blades of the fan can not be effectively increased to improve the heat-dissipating performance of the fan.

With the improvement of technology, one design is to allow two blades to be disposed closely as possible so as to slightly increase the discharged airflow. However, this way will let the mold have an acute notch as an edge on a knife, which may be vulnerable or easily damaged.

Therefore, it is desirable to provide a heat-dissipating device which can greatly enhance the heat-dissipating efficiency.

SUMMARY OF THE INVENTION

An object of the present invention is to provide a composite heat-dissipating device constructed by a plurality of impellers, each of which includes a plurality of blades. When the plurality of impellers are assembled together, the plurality of blades are arranged around the hub of the composite heat-dissipating device and there is an overlapped region formed between every two adjacent blades. Through such a design, it can significantly increase the number and size of blades so as to enhance the heat-dissipating performance.

Another object of the present invention is to provide a composite heat-dissipating device constructed by a plurality of impellers, each of which includes a plurality of blades. After the plurality of impellers are assembled together, all blades are arranged around the central hub of the composite heat-dissipating device. Because the size of the hub is circular, the size of blades can be precisely controlled so that the airflow field will not be affected and the heat-dissipating efficiency can be enhanced.

According to one aspect of the present invention, a first impeller of the plurality of impellers has a body and the plurality of blades are spacedly arranged around the body, and a second impeller of the plurality of impellers has a central part and the plurality of blades thereof are specedly arranged around the central part. When the first and second impellers are assembled together, the body of the first impeller and the central part of the second impeller are engaged together to constitute a hub of the composite heat-dissipating device, and the plurality of blades of the first and second impellers are alternately arranged around the hub.

In addition, the body of the first impeller has an engaging member located on an edge thereof, and the central part of the second impeller has a corresponding engaging member positioned on an edge thereof to be engaged with the engaging member of the first impeller.

Preferably, the body of the first impeller and the central part of the second impeller have rugged peripheries, respectively, which can be engaged with each other.

According to another aspect of the present invention, when the first and second impellers are assembled together, each blade of the first impeller is correspondingly engaged with that of the second impeller to constitute a complete blade of the composite heat-dissipating device, respectively. The proportion of each blade of the first impeller to the complete blade of the composite heat-dissipating device can be equal or unequal to that of each blade of the second impeller to the complete blade of the composite heat-dissipating device. Certainly, the engagement between each pair of the blades of the first and second impellers have optionally geometrical shapes which are able to be engaged with each other.

In addition, each of the plurality of blades is one selected from a group essentially consisting of inclined plate, triangle, trapezoid, curved, arcuate and wing structures.

The present invention may best be understood through the following description with reference to the accompanying drawings, in which:

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Figure 1A:
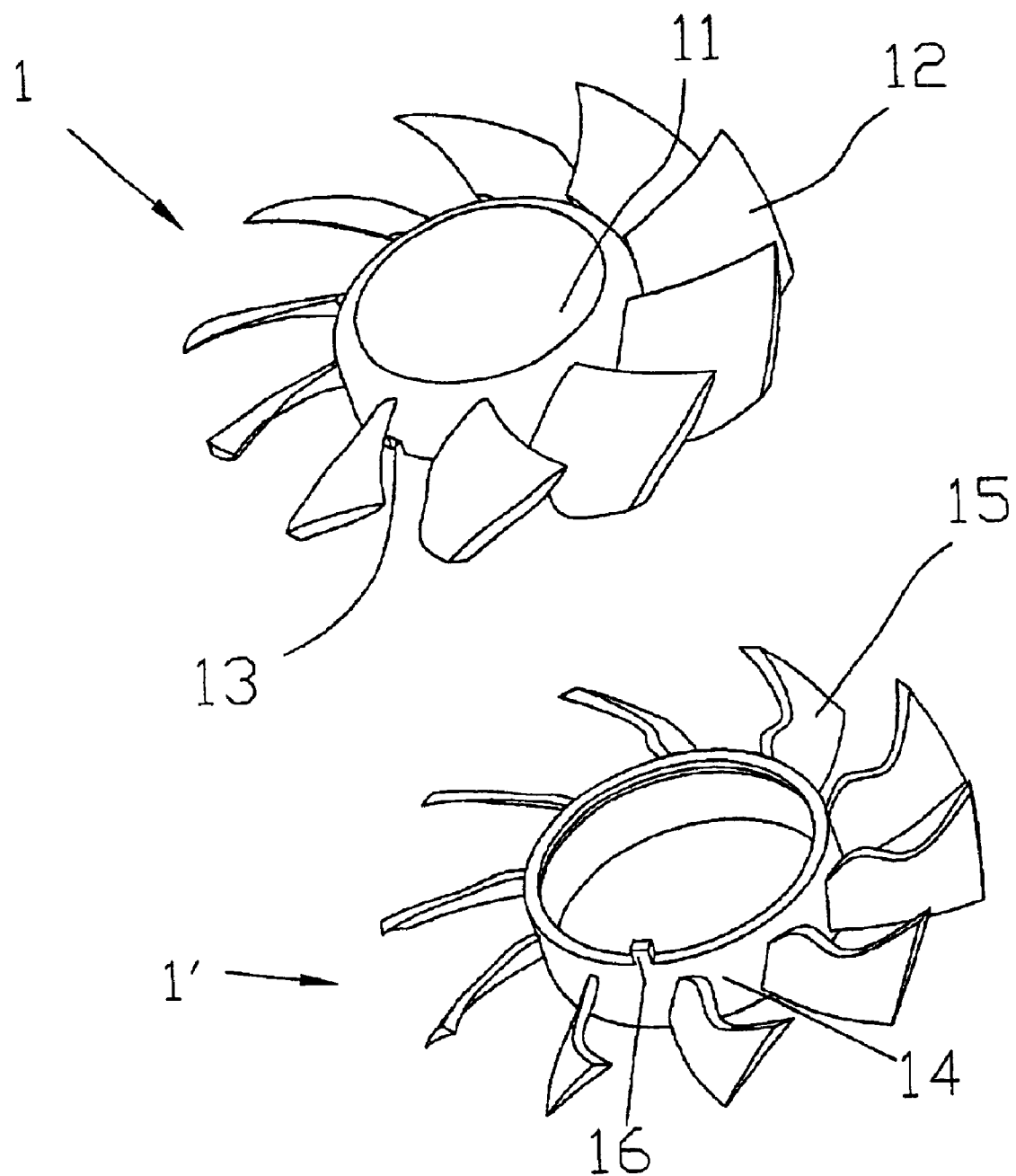
FIG. 1A is an exploded diagram showing the first preferred embodiment of a composite heat-dissipating device according to the present invention.
Figure 1B:
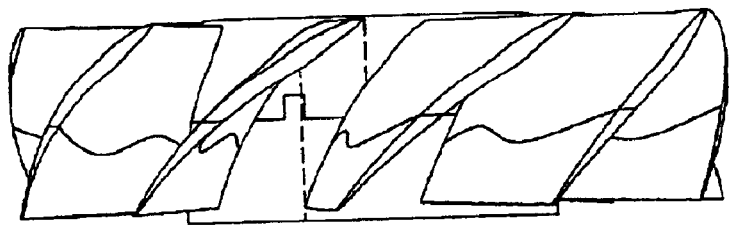
FIG. 1B is a side view of the composite heat-dissipating device of FIG. 1A after the impellers are assembled together.
Figure 1C:
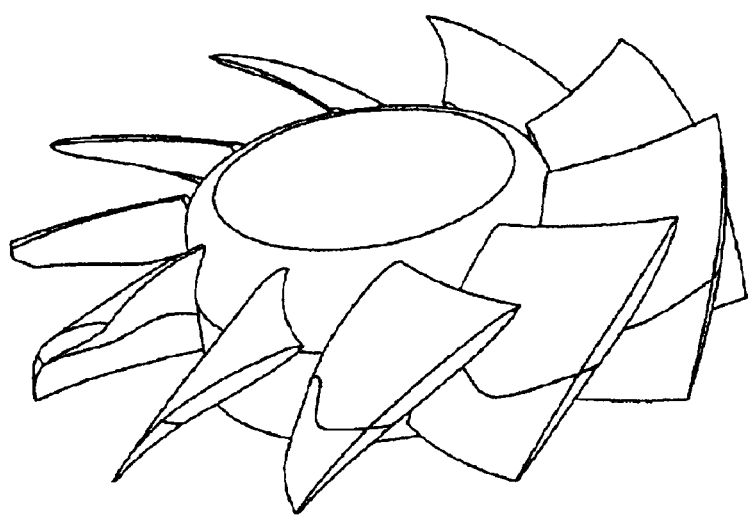
FIG. 1C is a perspective view of the composite heat-dissipating device of FIG. 1A after the impellers are assembled together.

Please refer to FIGS. 1A~1C which shows the first preferred embodiment of the composite heat-dissipating device of the present invention. The composite heat-dissipating device is constructed by an upper impeller 1 and a lower impeller 1'. The upper impeller 1 has a cup-shaped body 11 and a plurality of blades 12 arranged around the body 11. The lower impeller 1' has a circular element or ring 14 and a plurality of blades 15 arranged around the circular element 14. In addition, the body 11 of the upper impeller has a positioning notch 13 formed on the lower edge thereof, and the circular element of the second impeller has a positioning piece 16 outwardly protruded from the rim thereof to be engaged with the positioning notch of the upper impeller, and vice versa. The shape, number and position of these engaging member formed on the upper and lower impellers are not limited to the design shown in FIG. 1A. Any possible engagement between these two impellers can also be adopted.

As the upper and lower impellers are assembled together, each blade of the upper impeller will be correspondingly engaged with that of the lower impeller to constitute a complete blade of the composite heat-dissipating device, and the body of the upper impeller and the circular element of the lower impeller are engaged together to constitute a hub of the composite heat-dissipating device as shown in FIG. 1C. Preferably, the proportion of each blade of the upper impeller to the whole blade of the composite heat-dissipating device is unequal to that of the blade of the lower impeller to the whole blade of the composite heat-dissipating device. Such a design can contribute to the elimination of noise and vibration. Certainly, the proportion of each blade of the upper and lower impellers to the complete blade of the composite heat-dissipating device can also be equal. The engaged surfaces formed between each pair of blades respectively belonging to the upper and lower impellers includes but not limited to random or irregular shapes as long as both of them can be engaged with each other.

After the upper and lower impellers are assembled together, there is an overlapped region formed between every two adjacent blades of the composite heat-dissipating device, indicated by two imaginary lines shown in FIG. 1B, to serve as an airflow guiding route such that the number and size of blades can be greatly increased so as to enlarge the discharged airflow and the heat-dissipating efficiency.

Figure 2A:
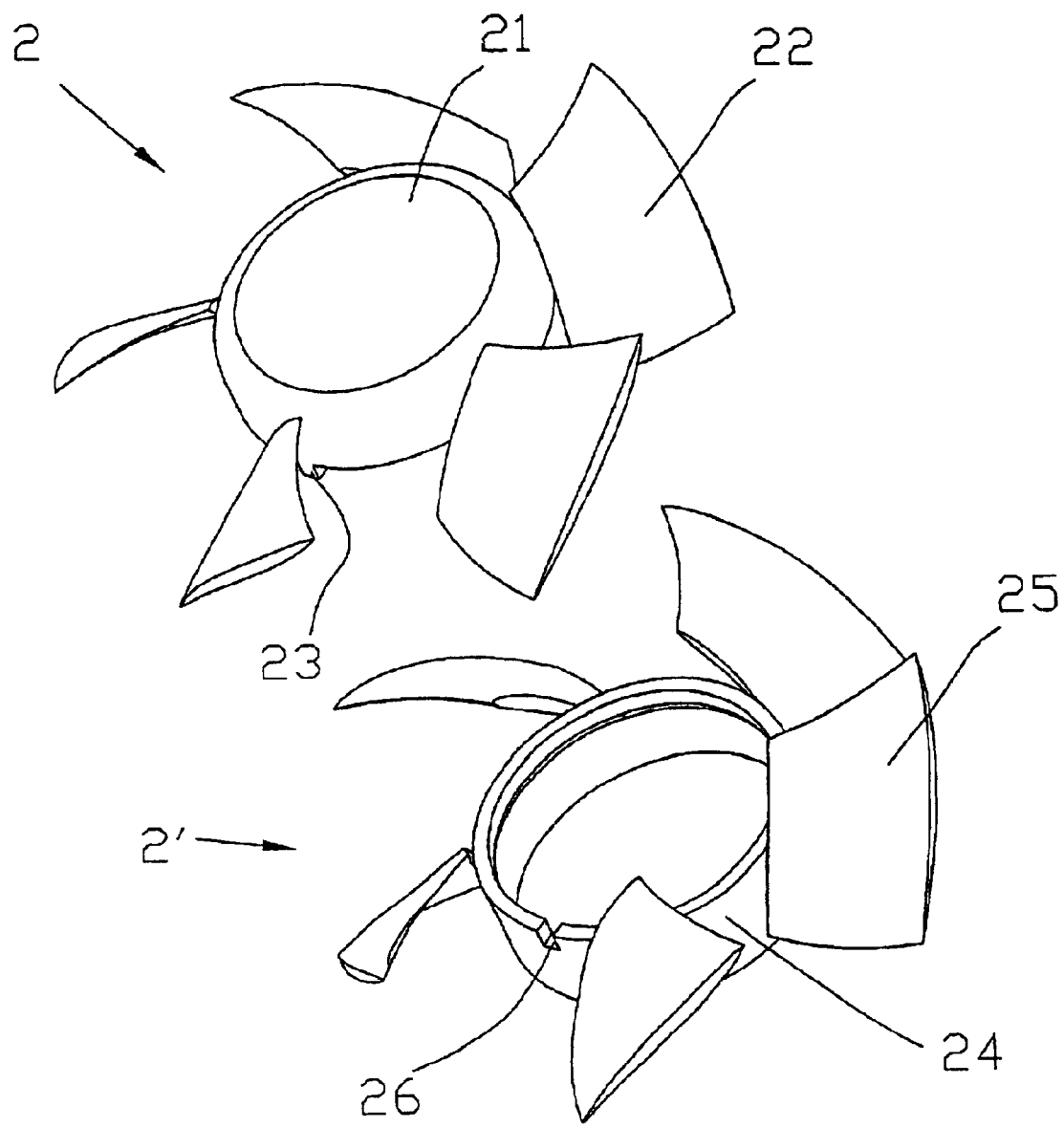
FIG. 2A is an exploded diagram showing the second preferred embodiment of a composite heat-dissipating device according to the present invention.
Figure 2B:
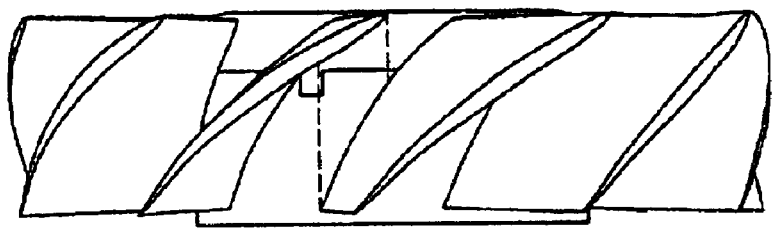
FIG. 2B is a side view of the composite heat-dissipating device of FIG. 2A after two impellers are assembled together.
Figure 2C:
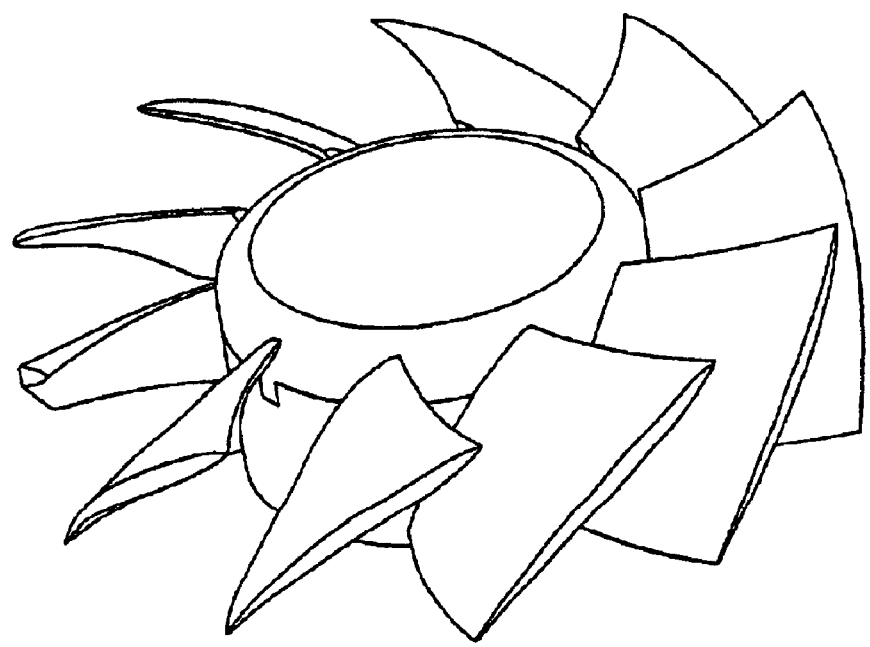
FIG. 2C is a perspective view of the composite heat-dissipating device of FIG. 2A after two impellers are assembled together.

Now, please refer to FIGS. 2A~2C which shows the second preferred embodiment of the composite heat-dissipating device of the present invention. The composite heat-dissipating device is constructed by an upper impeller 2 and a lower impeller 2'. The upper impeller 2 has a cup-shaped body 21 and a plurality of complete blades 22 spacedly arranged around the body 21. The lower impeller 2' has a circular element 24 and a plurality of complete blades 25 spacedly arranged around the circular element 24. The body 21 of the upper impeller has a positioning piece 23 outwardly protruded from the lower edge thereof and the circular element of the lower impeller 2' has a positioning notch 23 formed on the upper rim thereof to be engaged with the positioning piece of the upper impeller, and vice versa.

On the other hand, the body 21 of the upper impeller and the circular element 24 of the lower impeller are engaged together to constitute a hub of the composite heat-dissipating device, and the plurality of complete blades of the upper and lower impellers are alternately arranged around the hub of the composite heat-dissipating device when the upper and lower impellers are assembled together as shown in FIG. 2C. During the assembling process, the engaging member of impeller can be engaged with the corresponding engaging member of the other impeller by slightly rotating one impeller. Similarly, there is an overlapped region formed between every two adjacent blades of this composite heat-dissipating device, indicated by two imaginary lines shown in FIG. 2B, to serve as an airflow guiding route and increase the number and size of blades. In this instance, the number of blades of the upper impeller is equal to that of the lower impeller. Of course, the numbers of blades of the upper and lower impellers can also be different.

Figure 3:
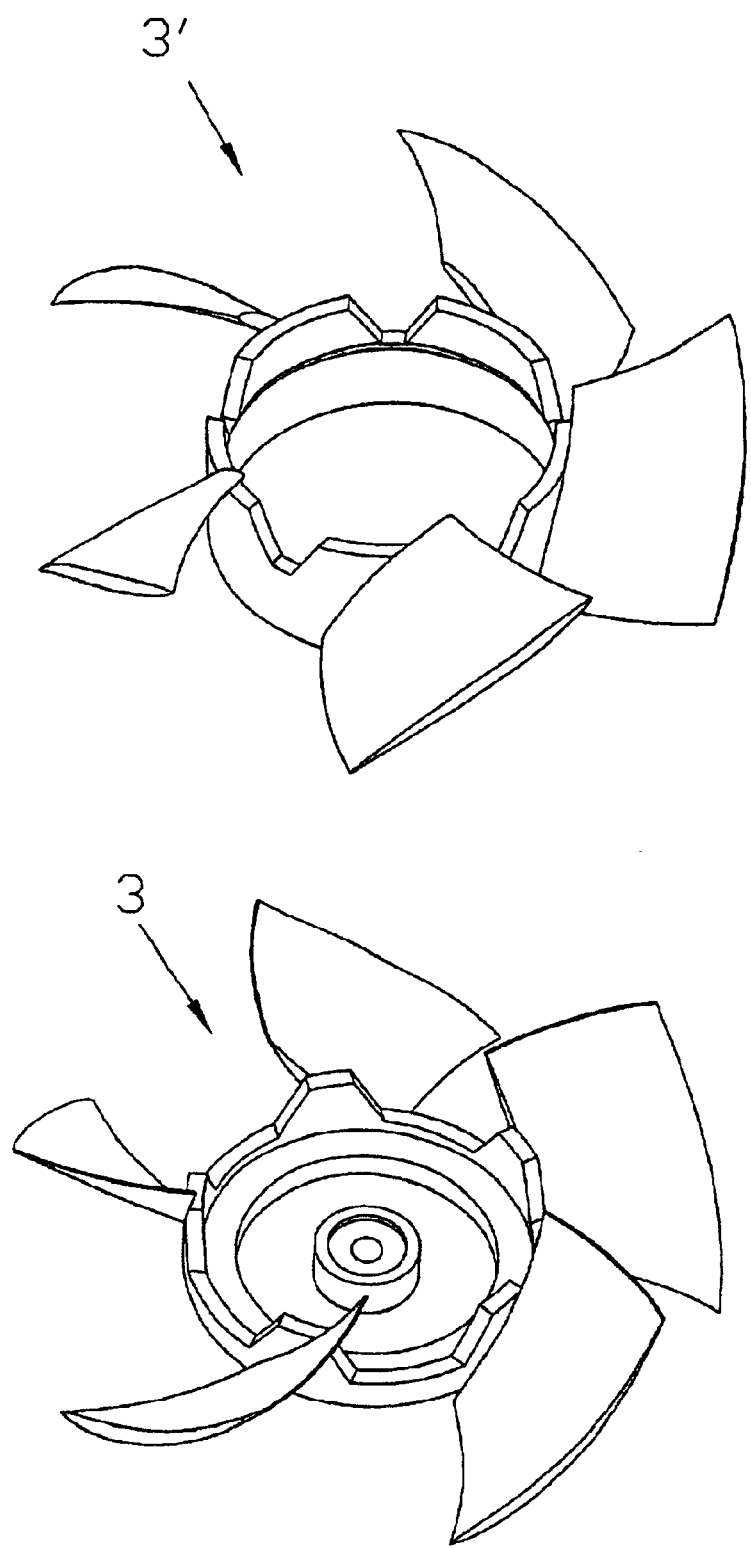
FIG. 3 is an exploded diagram showing the third preferred embodiment of a composite heat-dissipating device according to the present invention.

Alternatively, the engagement between the body of the upper impeller and the circular element of the lower impeller is not limited to the above-described embodiments, that is, both of which have smooth or plane peripheral surface except the positioning piece or the positioning notch. The design can be modified as shown in FIG. 3, i.e. the body of the impeller 3 and the circular element of the impeller 3' have one regularly or irregularly rugged periphery, respectively, as long as both of them can be engaged with each other. Through such a design, the bonding area between each blade and the body or the circular element can be increased and their connection can also be strengthened even though the length of each blade is relatively long.

Figure 4A:
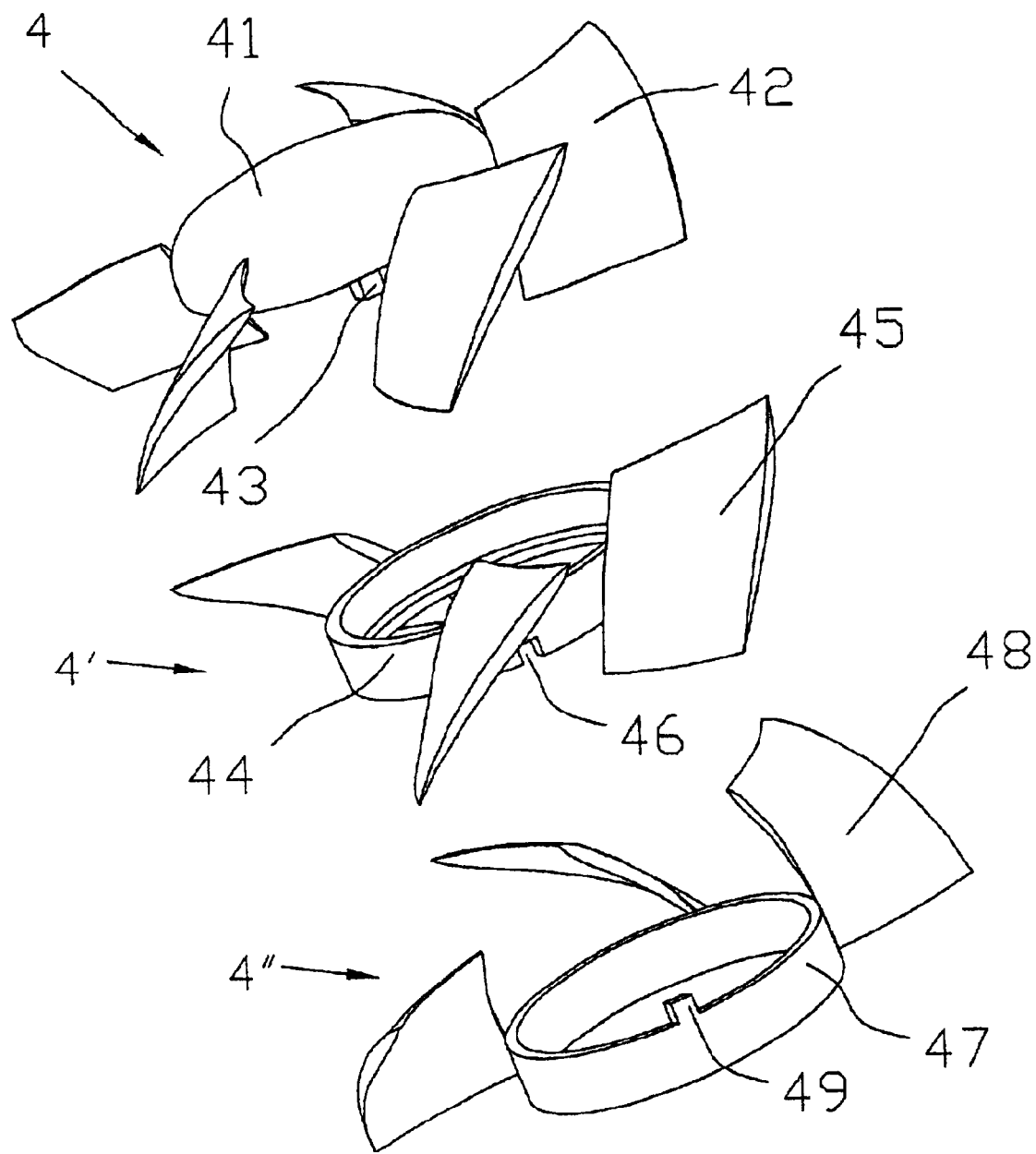
FIG. 4A is an exploded diagram showing the fourth preferred embodiment of a composite heat-dissipating device according to the present invention.
Figure 4B:
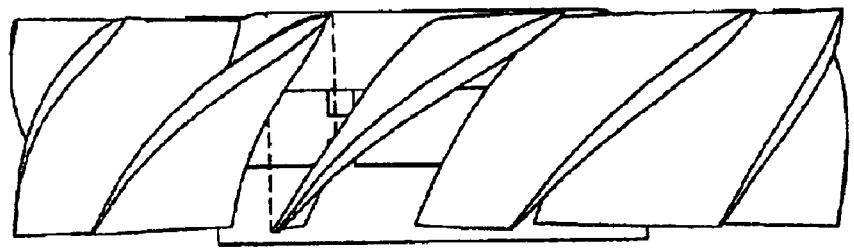
FIG. 4B is a side view of the composite heat-dissipating device of FIG. 4A after the impellers are assembled together.
Figure 4C:
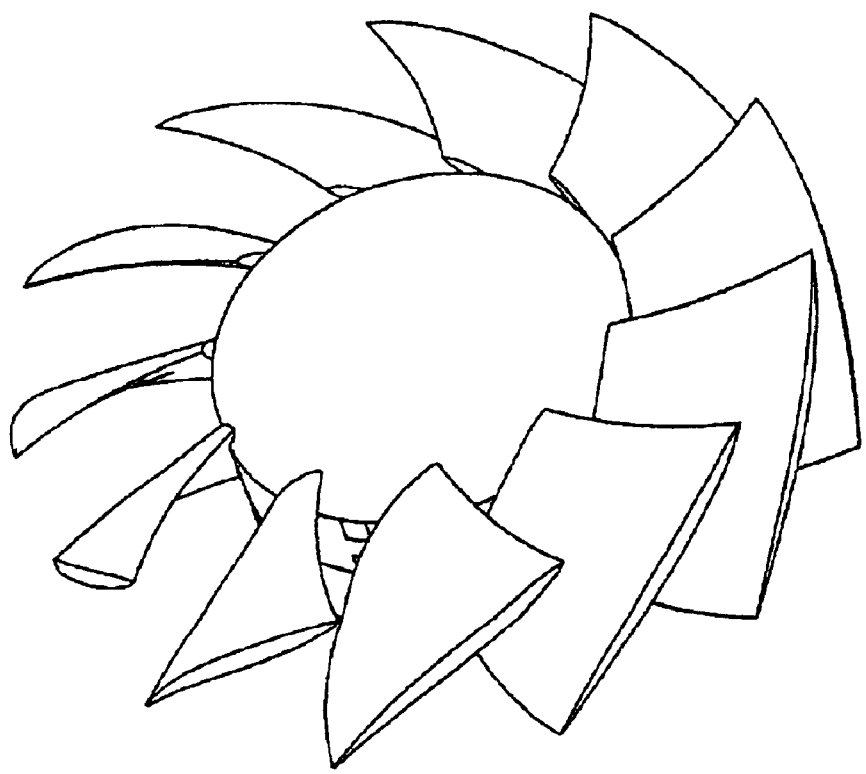
FIG. 4C is a perspective view of the composite heat-dissipating device of FIG. 4A after the impellers are assembled together.

In addition, please refer to FIGS. 4A~4C which shows the fourth preferred embodiment of the composite heat-dissipating device of the present invention. This composite heat-dissipating device is constructed by a first impeller 4, a second impeller 4' and a third impeller 4". The first impeller 4 has a cup-shaped body 41 and a plurality of complete blades 42 spacedly arranged around the body 41. The second impeller 4' has a circular element 44 and a plurality of complete blades 45 spacedly arranged around the circular element 44. The third impeller 4" has a circular element 47 and a plurality of complete blades 48 spacedly arranged around the circular element 47. The body 41 of the first impeller has a positioning piece 43 outwardly protruded from a lower edge thereof. The circular element 47 of the third impeller 4" has a positioning piece 49 formed on an upper rim thereof. The circular element 44 of the second impeller 4' has two positioning notch 46 respectively formed on the upper and lower edge thereof to be engaged with the positioning pieces 43, 49 of the first and third impellers, respectively.

When the first, second and third impellers are assembled together, the body 41 of the first impeller, the circular element 44 of the second impeller 4' and the circular element 47 of the third impeller are engaged together to constitute a hub of this composite heat-dissipating device, and the plurality of complete blades of the first, second and third impellers are alternately arranged around the hub of the composite heat-dissipating device as shown in FIG. 4C. Similarly, there is an overlapped region formed between every two adjacent blades of this composite heat-dissipating device, indicated by two imaginary lines shown in FIG. 4B, to serve as an airflow guiding route and increase the number and size of blades. Similarly, the numbers of blades of the first, second and third impellers can be equal or unequal.

Figure 5A:
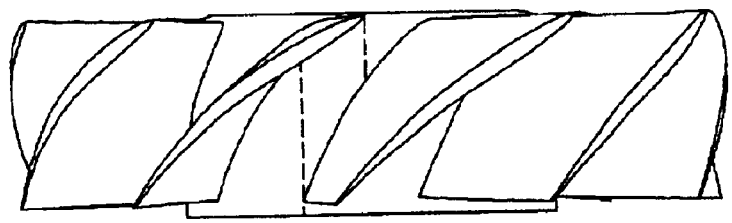
FIG. 5A is a side view of the fifth preferred embodiment of a composite heat-dissipating device according to the present invention.
Figure 5B:
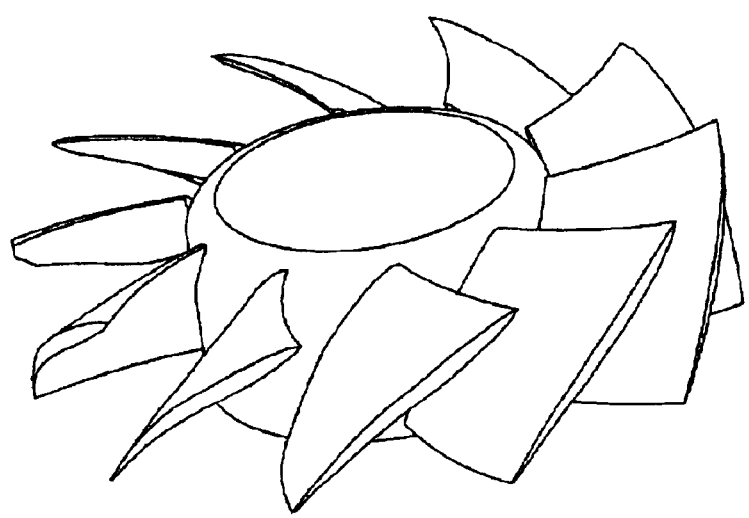
FIG. 5B is a perspective diagram showing the fifth preferred embodiment of a composite heat-dissipating device according to the present invention.

In addition to the above-mentioned embodiments, the plurality of impellers of the composite heat-dissipating device can also be integrally formed as a structure as shown in FIGS. 5A and 5B.

In above-described embodiments, each blade has the appearance like an inclined plate, triangle, trapezoid, curved, arcuate or wing structure.

Consequently, in the present invention, the plurality of blades are arranged around the hub of the composite heat-dissipating device and there is an overlapped region formed between every two adjacent blades after the plurality of impellers are assembled together. Through such a design, it can significantly increase the number and size of blades so as to enhance the heat-dissipating performance. Furthermore, because the shape of the hub is circular, the size of blades can be precisely controlled so that the airflow field will not be affected and the heat-dissipating efficiency can be raised.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A composite heat-dissipating device comprising a plurality of impellers, each of which has a plurality of partial blades, respectively assembled with a corresponding partial blade of another impeller to constitute a complete blade, wherein there is an overlapped region formed between every two adjacent complete blades when said plurality of impellers are assembled together, and each partial blade has a rugged periphery to be matched with that of the corresponding partial blade to eliminate vibration and noise.

2. The composite heat-dissipating device according to claim 1 wherein a first impeller of said plurality of impellers has a body and said plurality of partial blades are arranged around said body.

3. The composite heat-dissipating device according to claim 2 wherein a second impeller of said plurality of impellers has a central part and said plurality of partial blades thereof are arranged around said central part.

4. The composite heat-dissipating device according to claim 3 wherein when said first and second impellers are assembled together, said body of said first impeller and said central part of said second impeller are engaged together to constitute a hub of said composite heat-dissipating device.

5. The composite heat-dissipating device according to claim 4 wherein said body of said first impeller has an engaging member located on an edge thereof, and said central part of said second impeller has a corresponding engaging member positioned on an edge thereof to be engaged with said engaging member of said first impeller.

6. The composite heat-dissipating device according to claim 5 wherein the rugged periphery of each partial blade of said first impeller and the edge of the body are positioned at different levels, and the rugged periphery of each partial blade of said second impeller and the edge of the central part are positioned at different levels and when said first impeller is correspondingly engaged with said second impeller, the rugged peripheries of the partial blades of the first impeller are matched to those of the second impeller to constitute said complete blades of said composite heat-dissipating device, respectively.

7. The composite heat-dissipating device according to claim 6 wherein the proportion of each partial blade of said first impeller to said complete blade of the composite heat-dissipating device is equal or unequal to that of each partial blade of said second impeller to said complete blade of the composite heat-dissipating device.

8. The composite heat-dissipating device according to claim 6 wherein engagement between each pair of said partial blades of said first and second impellers have geometrical shapes which are able to be engaged with each other.

9. The composite heat-dissipating device according to claim 3 wherein said body of said first impeller and said central part of said second impeller have rugged peripheries, respectively, which can be engaged with each other.

10. The composite heat-dissipating device according to claim 1 wherein each of complete blades is one selected from a group essentially consisting of inclined plate, triangle, trapezoid, curved, arcuate and wing structures.

11. The composite heat-dissipating device according to claim 1 wherein said plurality of impellers are integrally formed together.

12. A composite heat-dissipating device comprising:
a first impeller having a body and a plurality of complete blades arranged around said body of said first impeller; and
a second impeller having a central part and a plurality of complete blades arranged around said central part of said second impeller;
wherein said body of said first impeller and said central part of said second impeller are engaged together to constitute a hub of said composite heat-dissipating device, and said plurality of complete blades of said first and second impellers are arranged around said hub of said composite heat-dissipating device and each complete blade is positioned at the same plane as the hub and has a free end when said first impeller and said second impeller are assembled together.

13. The composite heat-dissipating device according to claim 12 wherein there is an overlapped region formed between every two adjacent complete blades of said composite heat-dissipating device.

14. The composite heat-dissipating device according to claim 13 wherein said body of said first impeller has a positioning piece outwardly protruded from an edge thereof, and said central part of said second impeller has a positioning notch formed on an edge thereof to be engaged with said positioning piece of said first impeller.

15. The composite heat-dissipating device according to claim 13 wherein said body of said first impeller has a positioning notch formed on an edge thereof, and said central part of said second impeller has a positioning piece outwardly protruded from an edge thereof to be engaged with said positioning notch of said first impeller.

16. The composite heat-dissipating device according to claim 12 wherein said body of said first impeller and said central part of said second impeller have rugged peripheries, respectively, which are able to be engaged with each other.

17. The composite heat-dissipating device according to claim 12 wherein the number of said plurality of blades of said first and second impellers are equal or unequal.

18. The composite heat-dissipating device according to claim 12 wherein the complete blades of the first and second impellers are alternately arranged around the hub of the composite heat-dissipating device.

19. The composite heat-dissipating device according to claim 12 wherein the plurality of impellers are integrally formed together.

20. A composite heat-dissipating device comprising:
   a first impeller having a body and a plurality of complete blades arranged around said body of said first impeller; and
   a second impeller having a first central part and a plurality of complete blades arranged around said first central part of said second impeller;
   a third impeller having a second central part and a plurality of complete blades spacedly arranged around said second central part of said third impeller;
   wherein said body of said first impeller, said first central part of said second impeller and said second central part of said third impeller are engaged together to constitute a hub of said composite heat-dissipating device, and said plurality of complete blades of said first, second and third impellers are arranged around said hub of said composite heat-dissipating device at the same level and respectively have a free end when said first, second and third impellers are assembled together.

21. The composite heat-dissipating device according to claim 20 wherein there is an overlapped region formed between every two adjacent complete blades of said composite heat-dissipating device when said first, second and third impellers are assembled together.

22. The composite heat-dissipating device according to claim 20 wherein said central part of said second impeller has two engaging members located on two opposite edges thereof to be correspondingly engaged with another engaging members positioned on edges of said first and third impellers, respectively.

23. The composite heat-dissipating device according to claim 20 wherein said body of said first impeller, said first central part of said second impeller and said second central part of said third impeller have rugged peripheries, respectively, which are able to be engaged with each other.

24. The composite heat-dissipating device according to claim 20 wherein the complete blades of the first, second and third impellers are alternately arranged around the hub of the composite heat-dissipating device.

25. The composite heat-dissipating device according to claim 20 wherein the plurality of impellers are integrally formed together.

26. A composite heat-dissipating device comprising a plurality of impellers, each of which has a plurality of partial blades, respectively assembled with a corresponding partial blade of another impeller to constitute a complete blade, wherein there is an overlapped region formed between every two adjacent complete blades when said plurality of impellers are assembled together, and each partial blade has a periphery to be matched with that of the corresponding partial blade, in which the periphery of each partial blade of said first impeller and an edge of the body are positioned at different levels, and the periphery of each partial blade of said second impeller and an edge of the central part are positioned at different levels.

* * * * *